United States Patent
Eswaran et al.

(10) Patent No.: US 11,213,798 B2
(45) Date of Patent: Jan. 4, 2022

(54) METALLOCENE CATALYST FEED SYSTEM FOR SOLUTION POLYMERIZATION PROCESS

(71) Applicant: ExxonMobil Chemical Patents Inc., Baytown, TX (US)

(72) Inventors: Vetkav R. Eswaran, Houston, TX (US); Jay L. Reimers, Houston, TX (US); Keith C. Gallow, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 186 days.

(21) Appl. No.: 16/253,741

(22) Filed: Jan. 22, 2019

(65) Prior Publication Data

US 2019/0247821 A1    Aug. 15, 2019

Related U.S. Application Data

(60) Provisional application No. 62/629,165, filed on Feb. 12, 2018.

(51) Int. Cl.
| | |
|---|---|
| *C08F 10/02* | (2006.01) |
| *C08F 2/01* | (2006.01) |
| *C08F 2/04* | (2006.01) |
| *B01J 19/06* | (2006.01) |
| *C08F 10/06* | (2006.01) |
| *C08F 10/14* | (2006.01) |
| *B01J 19/00* | (2006.01) |
| *C08F 10/08* | (2006.01) |

(52) U.S. Cl.
CPC ............ *B01J 19/06* (2013.01); *B01J 19/0013* (2013.01); *C08F 10/02* (2013.01); *C08F 10/06* (2013.01); *C08F 10/08* (2013.01); *C08F 10/14* (2013.01); *B01J 2219/00083* (2013.01)

(58) Field of Classification Search
CPC ...... C08F 2/01; C08F 2/04; C08F 2/06; C08F 10/02; C08F 210/00
See application file for complete search history.

(56) References Cited

U.S. PATENT DOCUMENTS

| | | | |
|---|---|---|---|
| 4,540,753 A | | 9/1985 | Cozewith et al. |
| H001388 H | * | 12/1994 | Matlack .................. 526/283 |
| 5,475,067 A | * | 12/1995 | Schiffino ................ C08F 10/00 |
| | | | 526/351 |
| 9,102,773 B2 | * | 8/2015 | Hagadorn ............ C08F 210/06 |
| 9,688,795 B2 | | 6/2017 | Cerk et al. |
| 9,896,520 B2 | | 2/2018 | Kuehl et al. |
| 2018/0044453 A1 | | 2/2018 | Jiang et al. |
| 2018/0058764 A1 | | 3/2018 | Hong et al. |

* cited by examiner

*Primary Examiner* — Rip A Lee (57) ABSTRACT

Methods and systems for solution polymerization. The method can include forming a first mixture stream consisting essentially of at least one catalyst and a process solvent, and forming a second mixture stream consisting essentially of at least one activator and the process solvent. The first mixture stream and the second mixture stream can be fed separately to at least one reaction zone comprising one or more monomers dissolved in the process solvent where the at least one monomers can be polymerized within the at least one reaction zone in the presence of the catalyst, activator and process solvent to produce a polymer product.

19 Claims, 4 Drawing Sheets

METALLOCENE CATALYST FEED SYSTEM FOR SOLUTION POLYMERIZATION PROCESS

CROSS-REFERENCE OF RELATED APPLICATIONS

This application claims the benefit of Provisional Application No. 62/629,165, filed Feb. 12, 2018, the disclosure of which is incorporated herein by reference.

FIELD OF THE INVENTION

Embodiments described herein relate to olefin polymerization systems and processes. More particularly, embodiments described herein relate to solution polymerization for making olefin polymers.

BACKGROUND OF THE INVENTION

Olefin polymers are typically made using bulk, solution, slurry, or gas phase polymerization processes. Commercial solution polymerization processes, in particular, are currently conducted in continuous flow stirred tank reactors (CFSTR). Tubular reactors (TR) provide an alternate reactor system in which such solution polymerization can take place. A tubular reactor can be envisaged as a pipe through which the reactants, solvent, and product flow while the polymerization reaction is progressing. Tubular reactors can be loop reactors (LR) with recirculation of a portion of the product stream back to the reactor feed inlet, or once-through reactors with no such recirculation.

In loop reactors, the reactor feed is introduced into the recirculation stream at a suitable point in the loop and the reactor product is withdrawn at a different point from the recirculating flow. The ratio by mass of total recirculating flow to fresh feed flow can be varied from 0 (to mimic the performance of a plug flow reactor (PFR)) to 15 and above (to mimic the performance of a CFSTR). The ratio that is commercially practiced is typically in the range of 0.5 to 10. The circulation ratio may also be expressed as the ratio of total mass circulating in the loop divided by the mass flow rate of the effluent stream leaving the reactor loop.

When solution polymerization is conducted in a CFSTR, the catalyst and activator may be introduced into the reactor via separate injection nozzles or combined together and injected via a single nozzle. The catalyst and activator are usually dissolved or suspended in a solvent or carrier fluid, such as toluene, isohexane, mineral oil, etc. Here the term "solvent" refers to, and is used interchangeably as, the "carrier fluid" or a "mixture of carrier fluids". The carrier fluid for the catalyst and activator may be the same or different from the carrier fluid for the reactants.

The catalyst and activator are sometimes solid powders that are added at the desired proportion to a suitable carrier fluid or mixture of fluids to form a slurry or paste, which is then introduced into the reactor. The catalyst and activator can be prepared using the same solvent in the same mix tank to form a single solution. The catalyst solution may also be prepared separately from the activator solution. For example, the catalyst can be prepared in one solvent and the activator in a different solvent. A different dispersion media, such as mineral oil, or grease, or a combination of these with a controlled viscosity can be used. The separate catalyst solution and activator solution can then be mixed together in a piping manifold prior to injection into the reactor or injected into the reactor via separate nozzles. Depending on the desired solvent or dispersion media, the catalyst solution and/or the activator solution can be injected as a solution and the other as a slurry or as a dispersion.

The problem with the above techniques is that the catalyst and/or activator flowrate is often very low. When the catalyst and/or activator are prepared as slurries or suspensions, the particles that are not dissolved tend to settle in the pipes or form slugs with varying concentration. Such variation results in changes in reaction rate, which is detrimental to product quality. Particle deposition in pipe components or pump components may result in flow interruption, which in turn can disrupt production and/or change the product quality.

There is a need, therefore, for an improved technique for catalyst and/or activator injection to solution polymerization and improved systems for operating same.

SUMMARY OF THE INVENTION

Systems and method for solution polymerization are provided. The method can include forming a first mixture stream consisting essentially of at least one catalyst and a process solvent, and forming a second mixture stream consisting essentially of at least one activator and the process solvent. The first mixture stream and the second mixture stream can be fed separately to at least one reaction zone comprising one or more monomers dissolved in the process solvent where the at least one monomers can be polymerized within the at least one reaction zone in the presence of the catalyst, activator and process solvent to produce a polymer product.

In one embodiment of the method, the at least one monomers can be polymerized within the at least one reaction zone in the presence of the catalyst, activator and process solvent to obtain a first effluent stream comprising a solution of polymer dissolved in the process solvent. The first effluent stream can then be cooled in at least one spiral heat exchanger to produce a second effluent stream, wherein the first effluent stream flows through the at least one spiral heat exchanger in a cross-flow direction relative to spirals of the at least one spiral heat exchanger.

In another embodiment, the method for solution polymerization can include apportioning a reactant feed comprising one or more monomers, process solvent, and optionally one or more comonomers into a first substream, a second substream, a first slip stream and a second slip stream; forming a first mixture stream consisting essentially of at least one catalyst and the first substream; forming a second mixture stream consisting essentially of at least one activator and the second substream; mixing the first mixture stream with the first slip stream; mixing the second mixture stream with the second slip stream; feeding the resulting first mixture stream and the resulting second mixture stream separately to at least one reaction zone; polymerizing the at least one monomers and optional one or more comonomers within the at least one reaction zone in the presence of the catalyst, activator and process solvent; and recovering the polymer.

The system can include at least two inlets disposed on a reactor that contains one or more reaction zones therein. A first inlet can be used for injecting a mixture stream that consists essentially of at least one catalyst and a process solvent into at least one of the one or more reaction zones. A second inlet can be used for injecting a second mixture stream that consists essentially of at least one activator and the process solvent into at least one of the one or more reaction zones. The system can further include at least one spiral heat exchanger in fluid communication with the reactor, wherein a polymer effluent stream exiting the reactor flows through the at least one spiral heat exchanger in a cross-flow direction relative to the spirals of the heat exchanger.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

Certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function.

Additionally, in the following discussion and in the claims, the terms "including" and "comprising" are used in an open-ended fashion, and thus should be interpreted to mean "including, but not limited to." Furthermore, as it is used in the claims or specification, the term "or" is intended to encompass both exclusive and inclusive cases, i.e., "A or B" is intended to be synonymous with "at least one of A and B," unless otherwise expressly specified herein.

All numerical values in this disclosure can be exact or approximate values unless otherwise specifically stated. Accordingly, various embodiments of the disclosure may deviate from the numbers, values, and ranges disclosed herein without departing from the intended scope.

All documents described herein are incorporated by reference herein. When numerical lower limits and numerical upper limits are listed herein, ranges from any lower limit to any upper limit are contemplated.

In one embodiment of the invention, the basic and novel characteristics include the ability to improve mixing within the reactor by adding a catalyst and an activator separately into a reaction zone. In one embodiment, one mixture stream consisting essentially of process solvent and a catalyst excludes activator, and another mixture stream consisting essentially of process solvent and an activator excludes catalyst. Adding activator to a catalyst mixture stream would materially affect the basic and novel characteristics of this embodiment of the invention. In an embodiment, adding catalyst to the mixture stream including activator would materially alter the basic and novel characteristics of the invention. In some embodiments, the catalyst mixture stream, consisting essentially of catalyst and process solvent, may include other components that do not function as an activator. And in some embodiments, the activator mixture stream, consisting essentially of activator and process solvent, may include other components that do not function as a catalyst to be activated by the activator.

According to one or more embodiments provided herein, a first mixture stream consisting essentially of at least one catalyst and a process solvent, and a separate, second mixture stream consisting essentially of at least one activator and a process solvent can be introduced to one more reaction zones within a reactor for solution polymerization. Each stream can include a portion of the process solvent and with or without reactants present. The term "reactant" as used in this document refers in general to any one or more species that is reactive, including a monomer specie or a combination of monomer species (such as, for example, olefins like ethylene, propylene, butene, hexene, octene, etc., diolefins, such as butadiene, ethylidene norbornene, etc.). In cases where reactants are present, the catalyst stream ("first stream") can be introduced separately from the activator stream ("second stream") to avoid uncontrolled reactions in the pipe conveying the mixtures to the reactor. If the temperature of the mixture is low such as less than 50° C., less than 45° C., less than 40° C., or less than 35° C., and/or if reactants are absent or only present in small concentrations such as less than 20 wt %, less than 20 wt %, less than 18 wt %, less than 15 wt %, less than 10 wt %, less than 5 wt %, less than 1 wt %, or less than 0.5 wt %, and/or if the conveying time is short such as less than 5 minutes, less than 4 minutes, less than 2 minutes, less than 1 minute, or less than 30 seconds, then it is possible to combine the catalyst stream and activator stream prior to introduction into the reacting mixture.

Such a premix of the catalyst stream with process solvent with or without reactants, and a corresponding premix of the activator stream with process solvent with or without reactants increases the fluid flow rate in the lines to the reactor. These increased injection rates provide greater velocity which prevents the catalyst and activator components from settling in the feed lines and the injection points into the reactor by keeping the superficial velocity above the saltation velocity. The enhanced flow rates through the injection points into the reactor also improve mixing of the catalyst and/or activator in the reactor at the point of introduction. The circulating reacting fluid within the reactors usually has a higher viscosity because it contains product polymers. Surprisingly and unexpectedly, introducing the catalyst and/ or activator as a premix with process solvent with or without reactants improves mixing within the reactor, and improves the dispersion of the catalyst and/or activator into the reactor as compared to simply injecting the catalyst stream and/or activator stream without the additional process solvent and/or additional reactants. The superficial velocity for the premix of the catalyst stream and the premix of the activator stream introduced to the reactor can be the same or can be different. Each superficial velocity can be more than 2.5 ft/sec, such as at least 2.8, 3.0, 3.1, 3.2, 3.3, 3.5, 3.9, 4.0, 5.0 or 10.0 ft/sec. In some cases, the superficial velocity of each premix can range from a low of about 2.5, 3.0, 3.5 to a high of about 10, 15, or 20 ft/s.

Suitable diluents/solvents for polymerization include one or more non-coordinating, inert liquids. Examples include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated C4-10 alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably 0 wt % based upon the weight of the solvents.

The polymerization processes can be operated at a temperature of about 50° C. to about 220° C., about 70° C. to about 210° C., about 90° C. to about 200° C., from 100° C. to 190° C., or from about 130° C. to about 160° C. The polymerization process can be operated at a pressure of about 120 to about 2000 psi-a (about 12,411 kPa-a), about 200 to about 1000 psi-a (about 1379 to 6895 kPa-a), about 300 to about 600 psia (about 2068 to 4137 kPa-a). Preferably, the pressure is about 450 psi-a (about 3103 kPa-a). Hydrogen is sometimes used to modify the reaction and obtain the desired polymer with the desired chain length or molecular weight. When the flow rate of hydrogen is expressed as a ratio of hydrogen flow to other reactants or monomers flows, the molar ratio is typically between 0 to 1000 parts per million, more typically between 0 to 100 parts per million.

The first stream can contain the process solvent in amounts of about 20 vol % solvent or more, about 40 vol % or more, or about 90 vol % or more, based on the total volume of the first stream.

The catalyst can be present in an amount of about 25 wppb (parts per billion by weight) or more, about 50 wppb or more, about 100 wppb or more, or as high as 10,000 wppb, based on the total volume of the first stream.

The first stream can contain one or more reactants, for example one or more olefins such as ethylene, propylene, butene, hexene, octene, and/or dienes such as ethylidene norbornene. The first stream can further contain one or more chain transfer agents, such as hydrogen. The first stream can further contain one or more branching agents at proportions determined by the final composition of the polymer product.

The first stream can also contain one or more suitable diluents/solvents as described above. For example, the first stream can contain one or more paraffins such as ethane, propane, butane, pentane, hexane, heptane, octane, etc., and/or their isomers, and mineral oil, toluene, cyclohexane, etc. These inert fluids can be added to change the phase behavior of the polymer solution and/or enhance the solubility of the polymer at the reactor operating temperature and pressure.

The second stream can contain the process solvent in amounts of about 15 vol % solvent or more, about 45 vol % or more, or about 90 vol % or more, based on the total volume of the second stream.

The second stream can contain the activator(s) in amounts of about 25 wppb (parts per billion by weight) or more, about 50 wppb or more, about 100 wppb or more, or about 10,000 wppb or more, based on the total volume of the first stream and depending on the effectiveness of the activator. The molar proportion of activator to catalyst can be controlled by adjusting the flow rate of the activator and/or catalyst such that an optimal quantity of catalyst and activator species are present to maximize reactor productivity and catalyst efficiency. The ratio of catalyst to activator may range from functional equivalents of 0.1 to 10, or 0.5 to 5, or 1 to 1.

The second stream can contain one or more reactants, for example one or more olefins such as ethylene, propylene, butene, hexene, octene, and/or dienes such as ethylidene norbornene. The second stream can further contain one or more chain transfer agents, such as hydrogen. The second stream can further contain one or more branching agents at proportions determined by the final composition of the polymer product.

The second stream can also contain one or more suitable diluents/solvents as described above. For example, the second stream can contain one or more paraffins, such as ethane, propane, butane, pemtane, hexane, heptane, octane, etc., and/or their isomers, and mineral oil, toluene, cyclohexane, etc. These inert fluids can be added to change the phase behavior of the polymer solution and/or enhance the solubility of the polymer at the reactor operating temperature and pressure.

Figure 1:
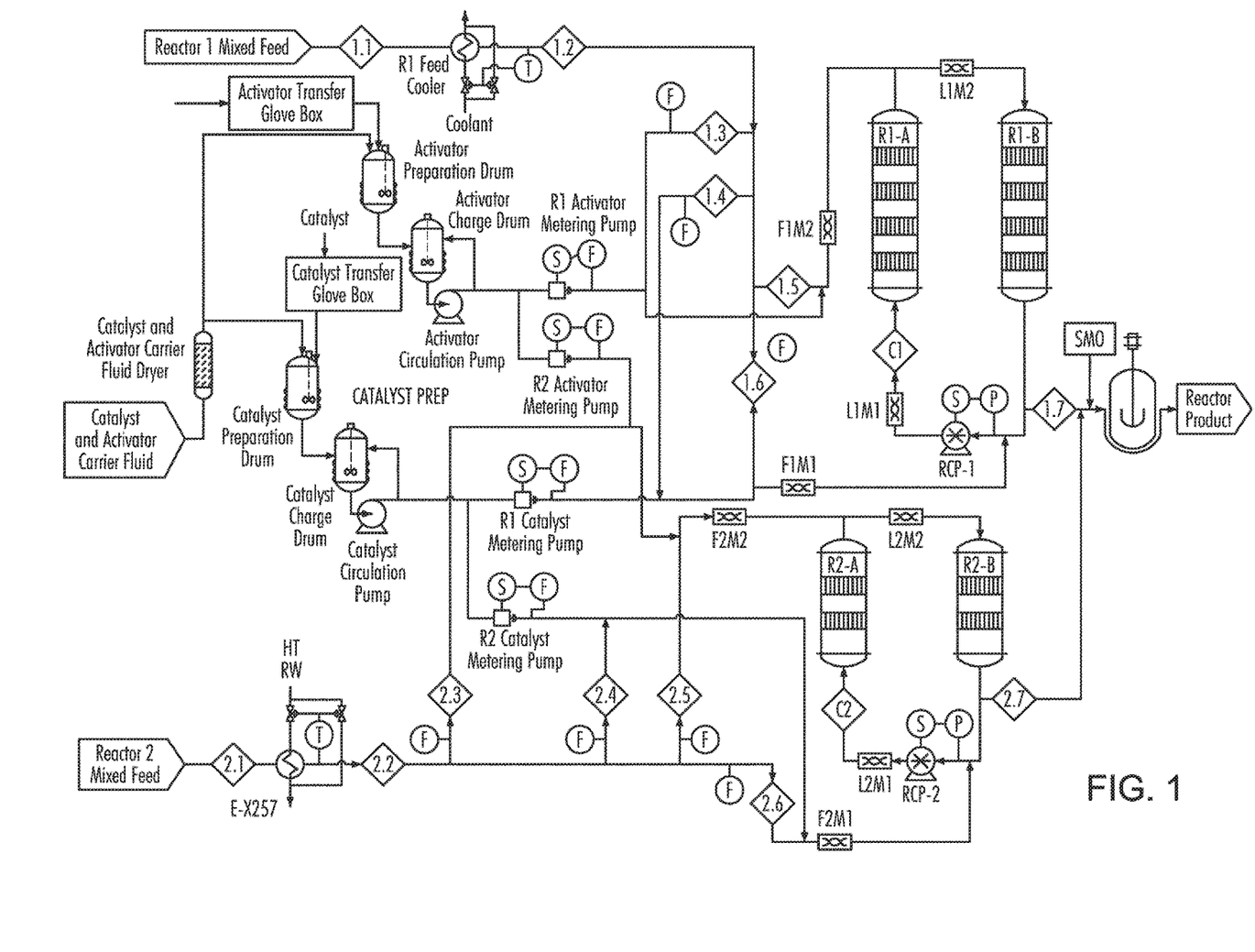
FIG. 1 shows an illustrative solution polymerization reaction system in accordance with one or more embodiments provided herein.

FIG. 1 shows an illustrative solution polymerization reaction system in accordance with one or more embodiments provided herein. The system can include two or more loop reactors R1 and R2. The reactors themselves can be arranged in parallel where the product from one reactor does not enter any other reactor, or the reactors can be arranged in series where all or a portion of the product from a prior reactor also flows through another succeeding reactor. FIG. 1 shows the reactors R1 and R2 in parallel.

Each reactor R1, R2 can be constructed in two segments—an upward flowing segment (R1-A and R2-A) and a downward flowing segment (R1-B and R2-B). These flow directions can be reversed, or can also be referred to as forward and reverse when the reactors R1, R2 are arranged or laid-out horizontally.

Each reactor R1, R2 can further include any number of heat exchangers installed therein or around the external walls as jackets for removal of the heat of reaction and/or for control of the temperature of the reacting stream flowing through each section. The number of sections in each segment, the number of segments, and even the number of reactors, can vary from 1 to 10 or even more, as determined by economics to minimize the total cost of the polymer production unit. Referring to FIG. 1, four sections are shown in upward flowing segment R1-A, four sections are shown in downward flowing segment R1-B, two sections are shown in upward flowing segment R2-A and two sections are shown in downward flowing segment R2-B.

A reactor feed stream 1.1, 1.2 containing one or monomers, one or more solvents and optionally one or more comonomers can be split or otherwise apportioned in any proportion, equal or not, into two or more streams (four are shown 1.3, 1.4, 1.5, and 1.6). As depicted in FIG. 1, stream 1.3 can be mixed with an activator stream that consists essentially of at least one activator and a process solvent, and stream 1.4 can be mixed with a catalyst stream that consists essentially of at least one catalyst and a process solvent.

The resulting activator stream 1.3 and the resulting catalyst stream 1.4 can then be introduced into the reactor R1 and/or the recirculating stream C1. For instance, activator stream 1.3 can be injected at two or more locations into the reactor R1, and the catalyst stream 1.4 can be injected at two or more locations into the recirculating stream C1.

Stream 1.5 can be a slip stream derived from the fresh monomer stream 1.1 that can be remixed with the activator/solvent stream 1.3 prior to entering the reactor R1. Similarly, a stream 1.6 can be a slip stream derived from the fresh monomer stream 1.1 that can be remixed with the catalyst/solvent stream 1.4 prior to entering the reactor R1 and/or the recirculating stream C1. Each slip stream 1.5, 1.6 can be less than 10 wt % of either substream 1.3, 1.4. For example, each slip stream 1.5, 1.6 can be less than 8 wt %, less than 6 wt %, less than 5 wt %, or less than 4 wt % of either substream 1.3, 1.4. Remixing the substreams 1.3, 1.4 with slip streams 1.5, 1.6 can be done with or without the use of static mixers. This remixing outside the reactor helps keep the catalyst stream velocity and the separate activator stream velocity above their respective saltation velocities, and can reduce the number of static mixers required in the reactor loop.

The second reactor system R2 can be used in parallel as depicted in FIG. 1. Similar to the first reactor system R1, a reactor feed stream 2.1, 2.2 containing the one or monomers and optionally one or more comonomers can be split into four sub-streams 2.3, 2.4, 2.5, and 2.6. Stream 2.3 can be mixed with the activator stream that consists essentially of at least one activator and a process solvent, which can then be introduced at one, two, or to more suitable points into the reactor R2. Stream 2.4 can be mixed with the catalyst stream that consists essentially of at least one catalyst and a process solvent, which can then be introduced at one, two, or more suitable points into the recirculating stream C2 of reactor R2.

As explained above for the first reactor loop R1, the mixed activator/solvent stream 2.3 can be remixed into a slip stream of fresh monomer stream 2.5 prior to entering the reactor R2. The mixed catalyst/solvent stream 2.4 can also be remixed into a slip stream of fresh monomer stream 2.6 prior to entering the reactor R2. These slip streams 2.5, 2.6 can be less than 10 wt %, less than 8 wt %, less than 6 wt %, less than 5 wt %, or less than 4 wt % of either substream 2.3, 2.4. As explained above, remixing streams 2.3, 2.5 and 2.4, 2.6 can be done with or without the use of static mixers, and helps keep the catalyst stream velocity and the separate activator stream velocity above their respective saltation velocities.

The drawing shows four static mixers R1-A, R1-B, R2-A, and R2-B. Such mixing elements can be strategically located between each heat exchange section. While providing additional mixing, such static mixers also increase resistance to flow and increase the pressure drop. It is possible to minimize the use of such mixing elements by adjusting the flow rates of streams 1.3, 1.4, 1.5, and 1.6 and similarly by adjusting flow rates of streams 2.3, 2.4, 2.5, and 2.6.

The flow rates of each stream 1.3, 1.4, 1.5, 1.6 and 2.3, 2.4, 2.5, and 2.6 can vary and can be changed as desired. One set of flow rates can be selected such that the velocity of streams 1.3 and 2.3 are sufficient to prevent or minimize deposition of the activator particles in its conveying conduit and such that the velocity of streams 1.4 and 2.4 are sufficient to prevent or minimize deposition of the catalyst particles in its conveying conduit (i.e. above the respective saltation velocities). The velocity of the streams 1.3, 1.4, 2.3, 2.4 also can be selected to maximize mixing efficiency at the point of introduction into their respective reactor R1 or R2. The flow rates of streams 1.5, 1.6 and 2.5, 2.6 can also be selected to control the molecular weight distribution and composition distribution along the growing polymer chains. Additional monomer or monomers can also be added into streams 1.5, 1.6 and/or 2.5, 2.6 to produce polymers with a broader range of compositions (or variability) by changing the composition of the monomer feeds (e.g., change the monomer and comonomer, as well as change the monomer and comonomer ratios within the streams 1.5, 1.6, 2.5 and/or 2.6).

FIG. 1 also depicts the second, activator stream entering C1 between reactor segments A and B and the first, catalyst stream entering between reactor segments B and A. Such injection points for the catalyst and activator containing streams can be interchanged. These could also be located at alternate locations between heat exchange sections and/or split into several sub streams for introduction between the heat exchanger sections. The number of such sub streams can be chosen to obtain the desired temperature distribution in the reactor.

Various injection points can produce various polymers of desired molecular weight, and compositional distribution. Various injection points also improves the ability to regulate reactor temperature and improve catalyst efficiency.

Monomers

The one or more monomers can be selected from α-olefin monomers and/or polyene monomers. Preferably, the one or more monomers are independently selected from C2-C40 α-olefins, preferably C2 to C20 α-olefins, more preferably C2 to C12 α-olefins (e.g., ethylene, propylene, butene, pentene, hexene, heptene, octene, nonene, decene, undecene, dodecene and isomers thereof). Preferably, the C2 to C40 α-olefin and cyclic olefin monomers and comonomers include ethylene, propylene, butene, pentene, hexene, heptene, octene, nonene, decene, undecene, dodecene, norbornene, cyclopentene, cycloheptene, cyclooctene, cyclododecene, 7-oxanorbornene, substituted derivatives thereof, and isomers thereof, preferably hexene, heptene, octene, nonene, decene, dodecene, cyclooctene, 1-hydroxy-4-cyclooctene, 1-acetoxy-4-cyclooctene, 5-methylcyclopentene, cyclopentene, and any combination thereof.

The one or more monomers may include a first C2-C12 α-olefin and a second C2-C12 α-olefin that is different from the first. The first monomer can be ethylene, and the second monomer can be an α-olefin other than ethylene. For instance, the second monomer can be a C3-C12 α-olefin or C3-C8 α-olefin, such as one of those identified above. In particular embodiments, the second monomer is propylene, butene (e.g., 1-butene), or hexene (e.g., 1-hexene). In yet further embodiments, the one or more monomers includes both propylene and butene in addition to the ethylene.

The one or more monomers may further include one or more polyenes. Suitable polyene monomers include any hydrocarbon structure, preferably C4 to C30, having at least two unsaturated bonds. Preferably the polyene is a non-conjugated diene with at least two unsaturated bonds, wherein one of the unsaturated bonds is readily incorporated into a polymer. The second bond may partially take part in polymerization to form cross-linked to polymers but normally provides at least some unsaturated bonds in the polymer product suitable for subsequent functionalization (such as with maleic acid or maleic anhydride), curing or vulcanization in post polymerization processes. Examples of dienes include, but are not limited to butadiene, octadiene, decadiene, hexadiene, and other C7 to C30 alkenes, as well as polybutadienes having a molecular weight (Mw) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to, dicyclopentadiene, and alkenyl alkylidene, cycloalkylenyol, and cylcoalkylidene norbornenes [including, e.g., 5-methylene-2-norbornene, 5-ethylidene-2-norbornene (ENB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB)]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. 5-ethylidene-2-norbornene (ENB), which can have two unsaturated bonds (but only one of which is polymerizable) is a preferred diene in particular embodiments. During polymerization, ENB is incorporated into a growing polymer chain through the endocyclic double bond only; leaving the exocyclic double bond unreacted. Since it is unreactive during the polymerization, no reactor crosslinking can occur. The unreacted double bond is available for use (e.g., crosslinking and functionalization) post-reactor. Thus, polymer compositions of some embodiments are free of polyenes having >1 polymerizable unsaturated bond.

Diene monomers as utilized in yet other embodiments have at least two polymerizable unsaturated bonds that can readily be incorporated into polymers to form cross-linked polymers. A polymerizable bond of a diene is referred as to a bond which can be incorporated or inserted into a polymer chain during the polymerization process of a growing chain. For polymerization using metallocene catalysts, examples of such dienes include butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene and certain multi-ring alicyclic fused and bridged ring dienes (such as tetrahydroindene; 7-oxanorbornadiene, dicyclopentadiene; bicyclo-(2.2.1)-hepta-2,5-diene; 5-vinyl-2-norbornene (VNB); 3,7-dimethyl-1,7-octadiene; 1,4-cyclohexadiene; 1,5-cyclooctadiene; 1,7-cyclododecadiene and vinyl cyclohexene). The content of diene with at least two polymerizable bonds in a polymer composition according to some embodiments is less than 0.5 wt %, preferably less than 0.1 wt % of the polymer composition.

Copolymers and copolymer compositions formed from monomers comprising both ethylene and propylene may in general be characterized as ethylene-propylene (EP) copolymers. Such copolymers may optionally include units derived from a diene monomer, as well, such that polymers formed according to such embodiments can be designated as EP(D)M polymers, indicating the optional inclusion of diene-derived units. Where such diene-derived units are present, the copolymer is more particularly characterized as an EPDM copolymer. Furthermore, EP(D)Ms and/or EPDMs according to some embodiments can be formed from a plurality of monomers including another α-olefin comonomer, such as 1-butene, in addition to the propylene comonomer.

Thus, according to some preferred embodiments, the one or more monomers can include ethylene, propylene, and, optionally, one or more dienes. In some embodiments, the monomers consist essentially of ethylene, propylene, and, optionally, one or more dienes. In particular embodiments, the monomers are ethylene, propylene, and a diene (such as ENB). In such embodiments, the diene content is less than 15 wt %, 10 wt %, 5 wt %, 1 wt %, or 0.1 wt % of the ethylene terpolymer.

Catalyst

The catalysts can include one more metallocene catalysts. Suitable metallocene catalysts include a catalyst that is a bridged fluorenyl-cyclopentadienyl group 4 catalyst (and/or Cp-fluorenyl variants), mono-Cp amido group 4 catalyst (and/or mono-Cp amido variants), biphenyl phenol (BPP) transition metal catalyst, pyridyl amide transition metal catalyst and/or pyridyl diamide transition metal catalyst.

Particularly preferred metallocene catalysts according to some embodiments include fluorenyl-cyclopentadienyl group 4 catalysts represented by formula (I):

where: J is a divalent bridging group (preferably comprising C, Si, or both);

M is a group 4 transition metal (with Hf being preferred in certain embodiments);

each X is independently a univalent anionic ligand, or two Xs are joined together to form a metallocycle ring with M, or two Xs are joined to form a chelating ligand, a diene ligand, or an alkylidene ligand; and each $R^1$, $R^2$, $R^3$, $R^4$, $R^5$, $R^6$, $R^7$, $R^8$, $R^9$, and $R^{19}$ is independently hydrogen, $C_1$-$C_{50}$ substituted or unsubstituted alkyl (preferably unsubstituted $C_1$-$C_{10}$ alkyl, more preferably $C_1$-$C_5$ alkyl), provided that any one or more of the pairs $R^1$ and $R^2$, $R^3$ and $R^4$, $R^5$ and $R^6$, $R^6$ and $R^7$, $R^8$ and $R^9$, and $R^9$ and $R^{10}$, may optionally be bonded together to form a saturated or partially saturated cyclic or fused ring structure. Both the activated and un-activated (precursor) forms of the compound represented by formula (I) are embraced by formula (I).

In at least one embodiment, J is a bridging group comprising carbon and/or silicon atoms, such as dialkylsilyl;

preferably J is selected from —CH$_2$—, —CH$_2$CH$_2$—, —C(CH$_3$)$_2$—, —SiMe$_2$-, -SiEt$_2$-, —SiPh$_2$-, —Si(Me)(C$_6$H$_5$)—, —C(Ph)$_2$-, —C(p-(Et)$_3$SiPh)$_2$-, —C(Si(Et)$_3$)$_2$-, (CH$_2$)$_3$Si=, (CH$_2$)$_4$Si=, and (CH$_2$)$_5$Si=, where Me is methyl, Et is ethyl, and Ph is phenyl, and further where each (CH$_2$)$_x$Si= indicates a cyclic silylene moiety having x carbons and the silicon atom in the cyclic group, e.g., where x is 4 in such compounds, J is cyclotetramethylenesilylene.

In at least one embodiment, R$^6$ and R$^9$ are each C$_1$ to C$_4$ alkyl, preferably C$_4$ alkyl such as tert-butyl; R$^1$-R$^4$, R$^5$, R$^7$, R$^8$, and R$^{19}$ are each independently methyl, ethyl, or H (preferably, each is H); J is selected from any of the groups described above (preferably J is (p-(Et)$_3$SiPh)$_2$C); M is Hf; and each X is independently C$_1$-C$_3$ alkyl or a halide (preferably each X is methyl).

A particularly preferred fluorenyl-cyclopentadienyl group 4 catalyst according to some embodiments is 1,1'-bis(4-triethylsilylphenyl)methylene-(cyclopentadienyl)(2,7-di-tertiary-butyl-fluoren-9-yl)hafnium dimethyl.

Activators

The terms "cocatalyst" and "activator" can be used interchangeably and can include any compound that can activate any one of the catalyst compounds described above (including either or both of the first and second metallocene catalyst compounds) by converting the neutral catalyst compound ("un-activated") to a catalytically active catalyst compound cation ("activated"). Suitable activators are described in Paragraphs [0110]-[0115] of PCT Publication No. WO 2016/114914 A1, which description is herein incorporated by reference; and/or in Paragraphs [0110]-[0133] of US 2015/0025209, which description is incorporated by reference herein.

Particularly useful activators in some embodiments of the present disclosure include non-coordinating anion (NCA) activators, such as those in Paragraph [0124] of US 2015/0025209, and also those in Columns 7 and 20-21 in U.S. Pat. No. 8,658,556, which description is incorporated by reference. Particular examples of suitable NCA activators include: N,N-dimethylanilinium tetrakis(pentafluorophenyl)borate, N,N-dimethylanilinium tetrakis(perfluoronaphthyl)borate, N,N-dimethylanilinium tetrakis (perfluorobiphenyl)borate, triphenylcarbenium tetrakis(perfluoronaphthyl)borate, bis(C$_4$-C$_{20}$alkyl)methylammonium tetrakis (perfluoronaphthyl)borate, Me$_3$NH$^+$ tetrakis(pentafluorophenyl)borate, Me$_3$NH$^+$ tetrakis(heptafluoro-2-naphthyl)borate, and bis(hydrogenated tallowalkyl)methylammonium tetrakis(pentafluorophenyl)borate. A particularly preferable NCA activator is N,N-dimethylanilinium tetrakis(pentafluorophenyl)borate.

The first stream and second stream can be introduced into the reactor to have a desired activator-to-catalyst molar ratio. Suitable ratios can range anywhere from 0.1:1 to 1000:1, such as from 0.5:1 to 100:1, such as 2:1 to 50:1. A preferred molar ratio is 1:1.

Optional Scavengers or Co-Activators

In addition to the activator compounds, scavengers or co-activators can be used. A "scavenger" is a compound that is typically added to facilitate polymerization by scavenging impurities (poisons that would otherwise react with the catalyst and deactivate it). Some scavengers may also act as activators, and they may also be referred to as co-activators. A co-activator can be used in conjunction with the activator.

Suitable scavengers can be or can include one or more aluminum alkyl or organoaluminum compounds. Suitable organoaluminum compounds can include, for example, trimethylaluminum, triethylaluminum, triisobutylaluminum, tri-n-hexylaluminum, tri-n-octylaluminum and the like. Other oxophilic species such as diethyl zinc can be used.

A polymer effluent stream exits the reactors, such as via streams 1.7, 2.7 as shown in FIG. 1. The polymer effluent can include the polymer product, active polymerization catalyst, unreacted monomers and polymerization solvent. To separate the process solvent and/or unreacted monomer from the polymer product, the polymer effluent stream can be heated (devolatized) at a temperature sufficient to remove the solvent and unreacted monomer from the polymer product. In certain embodiments, the polymer effluent stream exiting the reactor can be heated in at least one spiral heat exchanger.

Figure 2:
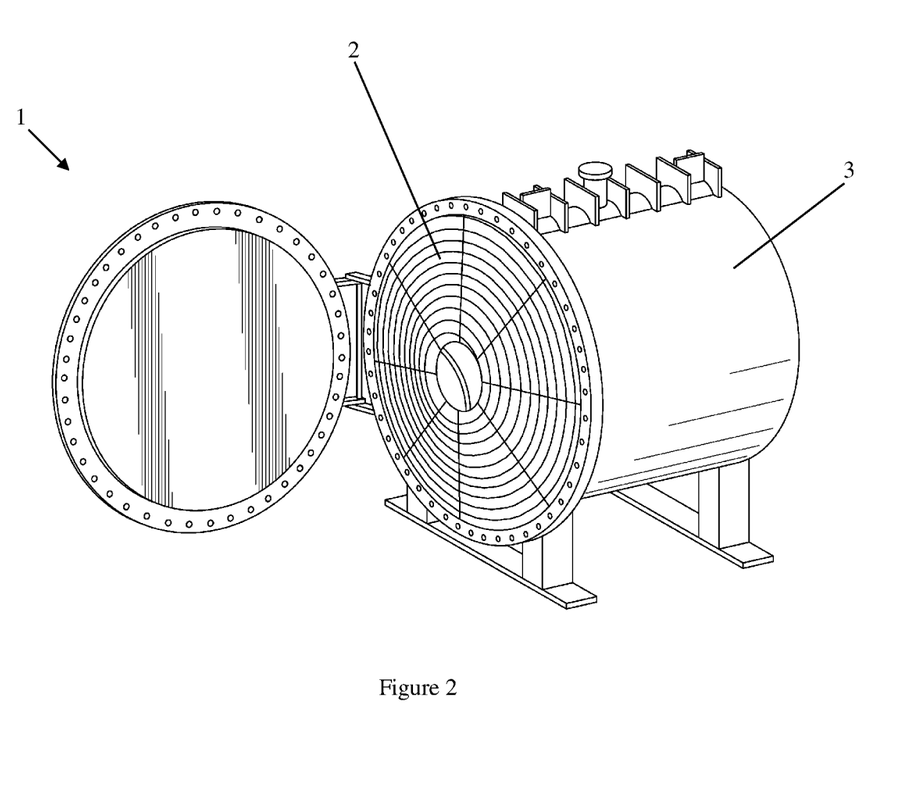
FIG. 2 illustrates a spiral heat exchanger according to one or more embodiments provided herein.

The spiral heat exchanger can include a body formed by at least one spiral sheet wound to form spirals which are arranged radially around an axis of the spiral heat exchanger. The spirals form at least one flow channel for flow of a heat exchange medium. For example, as shown in FIG. 2, spirals 2 can be enclosed by a substantially cylindrical shell 3 in a spiral heat exchanger 1. Further, the cylindrical 3 shell may include at least one inlet (not shown) and at least one outlet (not shown) in fluid communication with the at least one flow channel for providing and removing the heat exchange medium.

Figure 3:
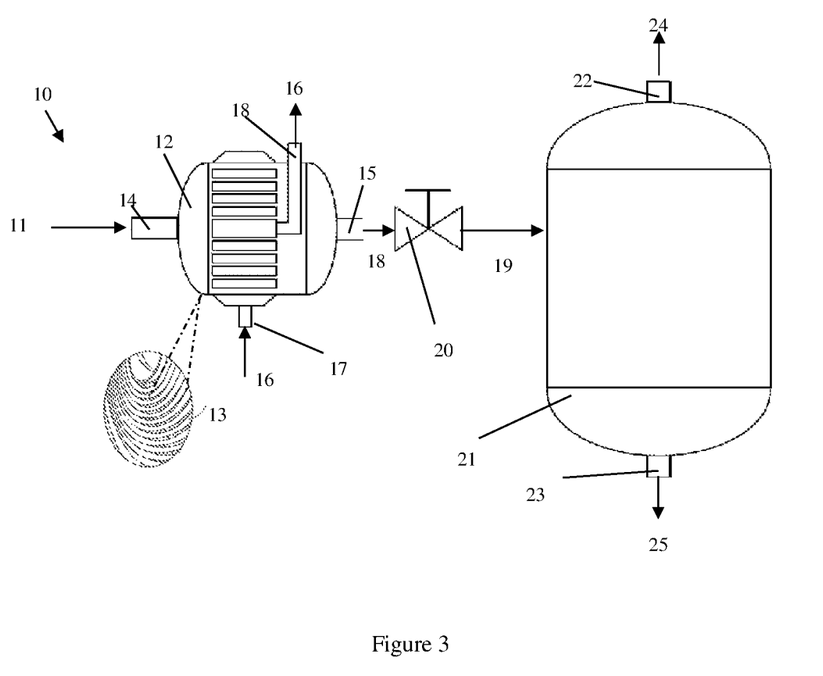
FIG. 3 illustrates a spiral heat exchanger preheater and separation vessel according to one or more embodiments provided herein.

In particular, the spiral heat exchanger can be oriented in a direction, for example, as shown in FIG. 3, such that a first effluent stream 11 flow in an axial direction through channels formed in between the spirals 13 of the spiral heat exchanger 12 thereby heating the first effluent stream 11 as it travels through the spiral heat exchanger to produce a second effluent stream 19 during devolatilization. In other words, the first effluent stream may flow through the spiral heat exchanger in a cross-flow direction relative to the spirals of the spiral heat exchanger. As used herein, "cross-flow" direction refers to a flow substantially orthogonal in direction to the spirals of the spiral heat exchanger. Substantially orthogonal may include flow of first effluent stream at an angle of about 70° to about 110°, preferably about 80° to about 100°, preferably about 85° to about 95°, more preferably about 88° to about 92°, more preferably about 90° with respect to the spirals of the spiral heat exchanger.

Additionally or alternatively, the spiral heat exchanger may comprise a plurality of spiral heat exchangers, e.g., at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 21, at least 22, at least 23, at least 24, etc. The plurality of spiral heat exchangers can be included in one heat exchanger and/or in multiple heat exchangers (e.g., 2, 3, 4, 5, 6, 7, 8 heat exchangers). Each spiral heat exchanger can be considered a separate preheater, or multiple spiral heat exchangers in one heat exchanger may cumulatively comprise one preheater.

The at least one spiral heat exchanger used in the processes described herein can be any suitable spiral heat exchanger known in the art. Non-limiting examples of suitable spiral heat exchangers include those described in U.S. Pat. Nos. 8,622,030; 8,075,845; 8,573,290; 7,640,972; 6,874,571; 6,644,391; 6,585,034; 4,679,621; and US 2010/0170665; 2010/0008833; 2002/0092646; 2004/0244968, each of which are incorporated by reference herein.

The spiral heat exchanger may have a surface area to volume ratio of about 20-30 ft$^2$/ft$^3$, while traditional STHEs have a surface area to volume ratio of about 2 ft$^2$/ft$^3$. Additionally, the spiral heat exchanger may have an open channel height of 0.5 to 30 feet, preferably 1 to 25 feet, preferably 3 to 20 feet, preferably 5 to 15 feet, preferably 5 to 10 feet.

The spiral configuration allows for higher heat transfer efficiency with a relatively low logarithmic mean temperature difference (LMTD). This low LMTD between the hot and cold fluids results in a minimal radial temperature difference allowing for a more uniform temperature distribution in the spiral heat exchanger.

Any suitable heat transfer medium can be used. Particularly useful heat transfer mediums are stable at the heating temperatures, and typically include those stable at about 200° C. or more. Examples of suitable heat transfer mediums can include, inter alia, water and other aqueous solutions, oil (e.g., hydrocarbons, such as mineral oil, kerosene, hexane, pentane, and the like). Synthetic heat transfer mediums can also be used, such as those for example that are available from The Dow Chemical Company (Midland, Mich.) under the trade name DOWTHERM™, including grades A, G, J, MX, Q, RP, and T, or from Eastman Chemical Company under the trade name THERMINOL®, including grades such as 59, LT, and XP, etc. Preferably, the heat exchange medium flows through the spirals at a temperature of about 60° C. to about 300° C., preferably about 75° C. to about 250° C., more preferably about 75° C. to about 215° C. Preferably, the heat exchange medium is also approved for food contact such that leakage of heat transfer fluid into the stream containing the product polymer is not contaminated and unsuitable for food contact polymer application.

In one embodiment, a two-stage heat exchange system is used, where the heat transfer fluid is used to moderate the temperature of an aqueous stream, which is then circulated through the heat exchangers in or around the reactor/s to remove the heat of reaction. This system further reduces the chances of polymer contamination by a leaking exchanger by placing an additional barrier between the heat transfer fluid and the stream containing the polymer product.

In one embodiment, the aqueous heat transfer medium can be water at a pressure high enough to prevent boiling. Other chemical species, such as ethylene glycol, may be added to the water to increase the operating temperature and pressure range. The addition of such chemical species as ethylene glycol also helps minimize the potential for freezing. Many such chemical species are known to those practicing the art of heat exchange.

In one embodiment, the aqueous heat transfer medium may also contain chemical species designed to limit or eliminate corrosion of the metallic materials of construction of the heat exchangers, pumps, pipes, etc. Such chemicals are available from companies such as ECOLAB, NALCO, SUEZ, GE-Betz, etc.

In various aspects, the polymer effluent stream exiting the spiral heat exchanger may have a temperature of at least about 60° C., at least about 75° C., at least about 100° C., at least about 125° C., at least about 150° C., at least about 175° C., at least about 200° C., at least about 215° C., at least about 225° C., at least about 250° C., at least about 275° C., at least about 300° C., or at least about 325° C. Ranges expressly disclosed include combinations of any of the above-enumerated values, e.g., about 60° C. to about 325° C., about 75° C. to about 300° C., about 100° C. to about 275° C., about 125° C. to about 250° C., etc. Preferably, the polymer effluent stream exiting the heat exchanger has a temperature of about 60° C. to about 300° C., about 75° C. to about 250° C., or about 75° C. to about 215° C.

Additionally, use of the spiral heat exchanger in the polymerization process described herein advantageously results in a lower pressure drop such that the first effluent stream may travel through the spiral heat exchanger at a high flow rate, which can create a self-cleaning flow passage which is not as susceptible to fouling as compared to a STHE or a PHE. For example, a pressure drop across the spiral heat exchanger can be ≤about 10.0 psi (about 69 kPa), ≤about 15.0 psi (about 103 kPa), ≤about 20.0 psi (about 138 kPa), ≤about 25.0 psi (about 172 kPa), ≤about 30.0 psi (about 207 kPa), ≤about 35.0 psi (about 241 kPa), ≤about 40.0 psi (about 276 kPa), ≤about 45.0 psi (about 311 kPa), ≤about 50.0 psi (about 345 kPa), ≤about 55.0 psi (about 379 kPa), ≤about 60.0 psi (about 414 kPa), or ≤about 65.0 psi (about 448 kPa). Preferably, a pressure drop across the spiral heat exchanger can be ≤about 60.0 psi (about 414 kPa), preferably ≤about 50.0 psi (about 345 kPa), or preferably ≤about 40.0 psi (about 276 kPa). Ranges expressly disclosed include combinations of any of the above-enumerated values, e.g., about 10.0 psi to about 65.0 psi (about 69 kPa to about 448 kPa), about 20.0 psi to about 60.0 psi (about 138 kPa to about 414 kPa), about 25.0 psi to about 55.0 psi (about 172 kPa to about 379 kPa), about 30.0 psi to about 50.0 psi (about 207 kPa to about 345 kPa), etc. The pressure drop across the at least one heat exchanger is measured by taking the difference of the pressure at the outlet of the heat exchanger (within 2 meters from the exit nozzle 15 at line 18 of FIG. 3) and the pressure at the inlet of the heat exchanger (within 2 meters upstream of the inlet nozzle 14 at line 11 of FIG. 3).

Figure 4:
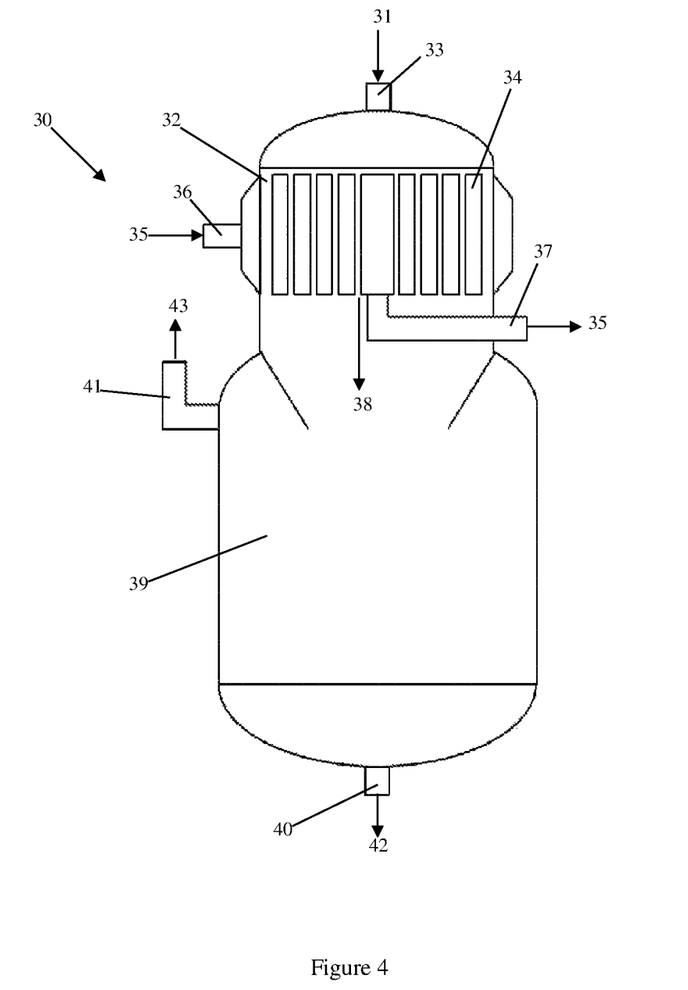
FIG. 4 illustrates a spiral heat exchanger preheater and separation vessel according to one or more embodiments provided herein.

As discussed above, as shown in FIG. 3, at least one spiral exchanger 12 can be oriented in a substantially horizontal direction where a first effluent stream 11 may flow in a substantially horizontal direction through the least one spiral heat exchanger 12 in system 10 in a cross-flow direction relative to spirals 13. The orientation of the spiral heat exchanger is not limited to such a horizontal orientation, but rather can be oriented in any direction so long as the first effluent stream flows through the spiral heat exchanger in a cross-flow direction relative to the spirals of the spiral heat exchanger. For example, at least one spiral heat exchanger 32 can be oriented in a substantially vertical direction, as shown in FIG. 4, where a first effluent stream 31 may flow through the spiral heat exchanger 32 in a substantially vertical direction.

In various aspects, the separation step described herein can be performed in a vessel on the second effluent stream under suitable conditions to produce a third effluent stream and a recycle stream. Preferably, the third effluent stream comprises a concentrated polymer solution (greater than 30 wt %, preferably greater than 50 wt %, preferably greater than about 80 wt % polymer, based upon the weight of the solution) and solvent and/or unreacted monomer (less than about 70 wt %, preferably less than about 50 wt %, preferably less than about 20 wt %, based upon the weight of the solution).

The separation can be performed in any suitable vessel, e.g., a flash vessel, high pressure flash vessel, etc. The separation can be conducted under conditions including a temperature of from about 60° C. to about 325° C., preferably about 75° C. to about 300° C., preferably about 100° C. to about 275° C., about 125° C. to about 250° C., or preferably about 75° C. to about 215° C. Additionally or alternatively, the separation can be conducted with a pressure of about 0.10 psia to about 400 psia (about 0.7 kPa to about 2758 kPa), preferably about 0.10 psia to about 350 psia (about 2758 kPa to about 2413 kPa), or preferably about 0.20 psia to about 650 psia (about 1.4 kPa to about 4482 kPa). The temperature and pressure of the separator are measured at line 24 of FIG. 3, within 2 meters from the exit nozzle 22 of the recycle stream.

Typically, the first effluent stream comprises varying amounts of solids. Depending on the amount of solids present in the first effluent stream, the spiral heat exchanger may either be connected to the vessel via a pressure valve or the spiral heat exchanger can be connected directly to the vessel (devolatilizer). For example, as shown in FIG. 3, when the first effluent comprises less than about 60 wt % solids based on the total weight of the first effluent stream, the spiral heat exchanger 12 can be connected to the vessel 20 via a pressure valve 19. Such a configuration may maintain a substantial amount of the volatile components in a liquid state and substantially prevent the second effluent stream from rapidly expanding and causing safety and operational issues. Additionally or alternatively, the configuration in FIG. 3 can be used when the first effluent comprises ≤about 50 wt % solids, ≤about 40 wt % solids, ≤about 30 wt % solids, ≤about 20 wt % solids, ≤about 10 wt % solids or about 1.0 wt %, based on the total weight of the first effluent stream. Ranges expressly disclosed include combinations of any of the above-enumerated values, e.g., about 1.0 wt % to less than about 60 wt %, about 10 wt % to about 50 wt %, about 20 wt % to less than about 60 wt %, etc.

In particular, as shown in FIG. 3, a first effluent stream 11 may enter at least one spiral heat exchanger 12 via a first inlet 14 in system 10. The first effluent stream 11 flows through the spiral heat exchanger 12 in a cross-flow direction relative to spirals 13. A heat exchange medium stream 16 enters the spiral heat exchanger 12 via a second inlet 17 at a suitable temperature as described above to heat the first effluent stream 11 as it travels through the spiral heat exchanger 12 to produce a second effluent stream 19, which exits the spiral heat exchanger 12 via a first outlet 15. The heat exchange medium stream 16 exits the spiral exchanger 12 via a second outlet 18. The second effluent stream 19 flows into a pressure valve 20 to maintain the volatile components in a liquid state. Then the second effluent stream 19 is introduced into vessel 21 (e.g., high pressure flash vessel) via an inlet (not shown), where unreacted monomer and/or solvent is separated from polymer to produce a third effluent stream 25 comprising polymer substantially free of solvent and a recycle stream 24 comprising the solvent and/or unreacted monomer. The third effluent stream 25 may exit the vessel 21 via a third outlet 23, and the recycle stream 24 may exit the vessel 21 via a fourth outlet 22.

Alternatively as shown in FIG. 4, when the first effluent comprises more than about 60 wt % solids based on the total weight of the first effluent stream, a spiral heat exchanger 32 can be directly connected to vessel 39 in system 30. In particular, the spiral heat exchanger 32 can be mounted on top of vessel 39 such that the spiral heat exchanger 32 is near a zone of reduced pressure and the bubbling process. Since the volatile component content is lower, volume expansion is limited. Further, such a configuration where the second effluent is near the bubbling process is desirable because it may increase the surface area of the polymer solution exposed to the surrounding environment thereby accelerating vaporization of the volatile components. Additionally or alternatively, the configuration in FIG. 4 can be used when the first effluent comprises ≥about 70 wt % solids, ≥about 80 wt % solids, or ≥about 90 wt %, based on the total weight of the first effluent stream. Ranges expressly disclosed include combinations of any of the above-enumerated values, e.g., greater than about 60 wt % to about 90 wt %, greater than about 60 wt % to about 80 wt %, about 70 wt % to about 90 wt %, etc.

In particular, as shown in FIG. 4, a first effluent stream 31 may enter at least one spiral heat exchanger 32 via a third inlet 33 in system 30. The first effluent stream 31 may flow through the spiral heat exchanger 32 in a cross-flow direction relative to spirals 34. A heat exchange medium stream 35 enters the spiral heat exchanger 32 via a fourth inlet 36 at a suitable temperature as described above to heat the first effluent stream 31 as it travels through the spiral heat exchanger 32 to produce a second effluent stream 38. The heat exchange medium stream 35 exits the spiral exchanger 32 via a fifth outlet 37. The second effluent stream 38 exits the spiral heat exchanger 32 into a vessel 39, where unreacted monomer and/or solvent is separated from polymer to produce a third effluent stream 42 comprising polymer substantially free of solvent and/or unreacted monomer and a recycle stream 43 comprising the solvent and/or unreacted monomer. The third effluent stream 42 may exit the vessel 39 via a sixth outlet 40, and the recycle stream 43 may exit the vessel 39 via a seventh outlet 41.

Recycle

In some embodiments, the process described herein, may further comprise recycling at least a portion of the recycle stream to be added during the polymerization step. Optionally, at least a portion of polymer (e.g., polyolefin) can be recycled back to the polymerization step. Polymer (e.g., polyolefin) can be produced with a recycle ratio of at least about 2, at least about 5, at least about 10, at least about 15, at least about 20, at least about 25, at least about 30, at least about 35, at least about 40, at least about 45, at least about 50, at least about 55, or at least about 60. Preferably, polymer (e.g., polyolefin) can be produced with a recycle ratio of at least about 5, at least about 20 or at least about 50. Preferably, polymer (e.g., polyolefin) can be produced with a recycle ratio of about 2 to about 60, preferably about 5 to about 50, preferably about 6 to about 35, preferably about 8 to about 20.

In other embodiments, processes for devolatilizing a polymer stream are provided herein. The processes comprise heating the polymer stream comprising a solution of the polymer, a solvent, and unreacted monomer in at least one spiral heat exchanger as described herein to produce a second effluent stream. The polymer stream may flow through the spiral heat exchanger in a cross-flow direction as described herein relative to spirals of the spiral heat exchanger. The at least one spiral heat exchanger may have a pressure drop as described herein (e.g., the pressure drop across the spiral heat exchanger can be less than or equal to about 50 psi-about 345 kPa). Additionally, the second effluent stream may have a temperature as described herein (e.g., about 75° C. to about 215° C.).

The process may further comprise performing at least one separation step as described herein on the first effluent stream. In particular, a separation step can be performed in a vessel, e.g., a flash vessel, high pressure flash vessel, on the first effluent stream under suitable conditions to produce a third effluent stream and a recycle stream. The third effluent stream may comprise polymer (e.g., polyolefin) as described herein, which is substantially free of solvent, and the quenching agent. In particular, the polymer polyethylene and/or polypropylene and optionally, further comprises a $C_2$ to $C_{20}$ co-monomer, e.g., selected from the group consisting of ethylene, propylene, butene, pentene, hexene, heptene, octene, nonene, decene, undecene, dodecene or a mixtures thereof.

The recycle stream can include the solvent as described herein and unreacted monomer as described herein.

In various aspects, the separation step can be performed under conditions as described herein (e.g., at a temperature of about 75° C. to about 250° C. and/or a pressure of about 0.20 psia to about 650 psia, about 1.4 kPa to about 4482 kPa).

In certain variations, where the polymer stream has a solids content as described herein, e.g., less than about 60 wt % solids based on the total weight of the polymer stream, the spiral heat exchanger can be connected to the vessel 39 via a pressure valve. Alternatively, when the polymer stream comprises more than about 60 wt % solids based on the total weight of the polymer stream, the spiral heat exchanger can be directly connected to vessel 39.

Propylene Copolymer

The resulting polymer product can be or can include a propylene-based polymer. The propylene-based polymer can have an average propylene content on a weight percent basis of from about 60 wt % to about 99.7 wt %, more preferably from about 60 wt % to about 99.5 wt %, more preferably from about 60 wt % to about 97 wt %, more preferably from about 60 wt % to about 95 wt % based on the weight of the polymer. In one embodiment, the balance comprises diene. In another embodiment, the balance comprises one or more dienes and one or more of the α-olefins described previously. Other preferred ranges are from about 80 wt % to about 95 wt % propylene, more preferably from about 83 wt % to about 95 wt % propylene, more preferably from about 84 wt % to about 95 wt % propylene, and more preferably from about 84 wt % to about 94 wt % propylene based on the weight of the polymer. The balance of the propylene-based polymer comprises a diene and optionally, one or more alpha-olefins. In one or more embodiments above or elsewhere herein, the alpha-olefin is butene, hexene or octene. In other embodiments, two alpha-olefins are present, preferably ethylene and one of butene, hexene or octene.

Preferably, the propylene-based polymer comprises about 0.3 wt % to about 24 wt %, of a non-conjugated diene based on the weight of the polymer, more preferably from about 0.5 wt % to about 12 wt %, more preferably about 0.6 wt % to about 8 wt %, and more preferably about 0.7 wt % to about 5 wt %. In other embodiments, the diene content ranges from about 0.3 wt % to about 10 wt %, more preferably from about 0.3 to about 5 wt %, more preferably from about 0.3 wt % to about 4 wt %, preferably from about 0.3 wt % to about 3.5 wt %, preferably from about 0.3 wt % to about 3.0 wt %, and preferably from about 0.3 wt % to about 2.5 wt % based on the weight of the polymer. In one or more embodiments above or elsewhere herein, the propylene-based polymer comprises ENB in an amount of from about 0.5 to about 4 wt %, more preferably from about 0.5 to about 2.5 wt %, and more preferably from about 0.5 to about 2.0 wt %.

In other embodiments, the propylene-based polymer preferably comprises propylene and diene in one or more of the ranges described above with the balance comprising one or more C2 and/or C4-C20 olefins. In general, this will amount to the propylene-based polymer preferably comprising from about 5 to about 40 wt % of one or more C2 and/or C4-C20 olefins based the weight of the polymer. When C2 and/or a C4-C20 olefins are present the combined amounts of these olefins in the polymer is preferably at least about 5 wt % and falling within the ranges described herein. Other preferred ranges for the one or more α-olefins include from about 5 wt % to about 35 wt %, more preferably from about 5 wt % to about 30 wt %, more preferably from about 5 wt % to about 25 wt %, more preferably from about 5 wt % to about 20 wt %, more preferably from about 5 to about 17 wt % and more preferably from about 5 wt % to about 16 wt %.

The propylene-based polymer can have a weight average molecular weight (Mw) of 5,000,000 or less, a number average molecular weight (Mn) of about 3,000,000 or less, a z-average molecular weight (Mz) of about 10,000,000 or less, and a g' index of 0.95 or greater measured at the weight average molecular weight (Mw) of the polymer using isotactic polypropylene as the baseline, all of which can be determined by size exclusion chromatography, e.g., 3D SEC, also referred to as GPC-3D as described herein.

The propylene-based polymer can have a Mw of about 5,000 to about 5,000,000 g/mole, more preferably a Mw of about 10,000 to about 1,000,000, more preferably a Mw of about 20,000 to about 500,000, more preferably a Mw of about 50,000 to about 400,000, wherein Mw is determined as described herein.

The propylene-based polymer can have a Mn of about 2,500 to about 2,500,000 g/mole, more preferably a Mn of about 5,000 to about 500,000, more preferably a Mn of about 10,000 to about 250,000, more preferably a Mn of about 25,000 to about 200,000, wherein Mn is determined as described herein.

The propylene-based polymer can have a Mz of about 10,000 to about 7,000,000 g/mole, more preferably a Mz of about 50,000 to about 1,000,000, more preferably a Mz of about 80,000 to about 700,000, more preferably a Mz of about 100,000 to about 500,000, wherein Mz is determined as described herein.

The molecular weight distribution index (MWD=(Mw/Mn)), sometimes referred to as a "polydispersity index" (PDI), of the propylene-based polymer can be about 1.5 to 40. In an embodiment the MWD can have an upper limit of 40, or 20, or 10, or 5, or 4.5, and a lower limit of 1.5, or 1.8, or 2.0. In one or more embodiments above or elsewhere herein, the MWD of the propylene-based polymer is about 1.8 to 5 and most preferably about 1.8 to 3. Techniques for determining the molecular weight (Mn and Mw) and molecular weight distribution (MWD) can be found in U.S. Pat. No. 4,540,753 (Cozewith, Ju and Verstrate) (which is incorporated by reference herein for purposes of U.S. practices) and references cited therein, in Macromolecules, 1988, volume 21, p 3360 (Verstrate et al.), which is herein incorporated by reference for purposes of US practice, and references cited therein, and in accordance with the procedures disclosed in U.S. Pat. No. 6,525,157, column 5, lines 1-44, which patent is hereby incorporated by reference in its entirety.

The propylene-based polymer can have a g' index value of 0.95 or greater, preferably at least 0.98, with at least 0.99 being more preferred, wherein g' is measured at the Mw of the polymer using the intrinsic viscosity of isotactic polypropylene as the baseline. For use herein, the g' index is defined as:

$$g' = \frac{\eta_b}{\eta_l},$$

where $\eta_b$ is the intrinsic viscosity of the propylene-based polymer and $\eta_l$ is the intrinsic viscosity of a linear polymer of the same viscosity-averaged molecular weight ($M_v$) as the propylene-based polymer. $\eta_l = KM_v^{\alpha}$, K and α were measured values for linear polymers and should be obtained on the same instrument as the one used for the g' index measurement.

The propylene-based polymer can have a density of about 0.85 g/cm3 to about 0.92 g/cm3, more preferably, about 0.87 g/cm3 to 0.90 g/cm3, more preferably about 0.88 g/cm3 to about 0.89 g/cm3 at room temperature as measured per the ASTM D-1505 test method.

The propylene-based polymer can have a melt flow rate (MFR, 2.16 kg weight @ 230° C.), equal to or greater than 0.2 g/10 min as measured according to the ASTM D-1238 (A) test method as modified (described below). Preferably, the MFR (2.16 kg @ 230° C.) is from about 0.5 g/10 min to about 200 g/10 min and more preferably from about 1 g/10 min to about 100 g/10 min. In an embodiment, the propylene-based polymer can have an MFR of 0.5 g/10 min to 200 g/10 min, especially from 2 g/10 min to 30 g/10 min, more preferably from 5 g/10 min to 30 g/10 min, more preferably 10 g/10 min to 30 g/10 min or more especially 10 g/10 min to about 25 g/10 min.

The propylene-based polymer can have a Mooney viscosity ML (1+4)@125° C., as determined according to ASTM D1646, of less than 100, more preferably less than 75, even more preferably less than 60, most preferably less than 30.

The propylene-based polymer can have a heat of fusion (Hf) determined according to the DSC procedure described later, which is greater than or equal to about 0.5 Joules per gram (J/g), and is ≤about 80 J/g, preferably ≤about 75 J/g, preferably ≤about 70 J/g, more preferably ≤about 60 J/g, more preferably ≤about 50 J/g, more preferably ≤about 35 J/g. Also preferably, the propylene-based polymer can have a heat of fusion that is greater than or equal to about 1 J/g, preferably greater than or equal to about 5 J/g. In another embodiment, the propylene-based polymer can have a heat of fusion (Hf), which is from about 0.5 J/g to about 75 J/g, preferably from about 1 J/g to about 75 J/g, more preferably from about 0.5 J/g to about 35 J/g. Preferred propylene-based polymers and compositions can be characterized in terms of both their melting points (Tm) and heats of fusion, which properties can be influenced by the presence of comonomers or steric irregularities that hinder the formation of crystallites by the polymer chains. In one or more embodiments, the heat of fusion ranges from a lower limit of 1.0 J/g, or 1.5 J/g, or 3.0 J/g, or 4.0 J/g, or 6.0 J/g, or 7.0 J/g, to an upper limit of 30 J/g, or 35 J/g, or 40 J/g, or 50 J/g, or 60 J/g or 70 J/g, or 75 J/g, or 80 J/g.

The crystallinity of the propylene-based polymer can also be expressed in terms of percentage of crystallinity (i.e., % crystallinity). The propylene-based polymer can have a % crystallinity of from 0.5% to 40%, preferably 1% to 30%, more preferably 5% to 25% wherein % crystallinity is determined according to the DSC procedure described below. In another embodiment, the propylene-based polymer preferably can have a crystallinity of less than 40%, preferably about 0.25% to about 25%, more preferably from about 0.5% to about 22%, and most preferably from about 0.5% to about 20%. As disclosed above, the thermal energy for the highest order of polypropylene is estimated at 189 J/g (i.e., 100% crystallinity is equal to 189 J/g.).

In addition to this level of crystallinity, the propylene-based polymer preferably can have a single broad melting transition. However, the propylene-based polymer can show secondary melting peaks adjacent to the principal peak, but for purposes herein, such secondary melting peaks are considered together as a single melting point, with the highest of these peaks (relative to baseline as described herein) being considered the melting point of the propylene-based polymer.

The propylene-based polymer preferably can have a melting point (measured by DSC) of equal to or less than 100° C., preferably less than 90° C., preferably less than 80° C., more preferably less than or equal to 75° C., preferably from about 25° C. to about 80° C., preferably about 25° C. to about 75° C., more preferably about 30° C. to about 65° C.

The Differential Scanning calorimetry (DSC) procedure can be used to determine heat of fusion and melting temperature of the propylene-based polymer. The method is as follows: about 0.5 grams of polymer is weighed out and pressed to a thickness of about 15-20 mils (about 381-508 microns) at about 140° C.-150° C., using a "DSC mold" and Mylar as a backing sheet. The pressed pad is allowed to cool to ambient temperature by hanging in air (the Mylar is not removed). The pressed pad is annealed at room temperature (23-25° C.) for about 8 days. At the end of this period, an about 15-20 mg disc is removed from the pressed pad using a punch die and is placed in a 10 microliter aluminum sample pan. The sample is placed in a Differential Scanning calorimeter (Perkin Elmer Pyris 1 Thermal Analysis System) and is cooled to about −100° C. The sample is heated at 10° C./min to attain a final temperature of about 165° C. The thermal output, recorded as the area under the melting peak of the sample, is a measure of the heat of fusion and can be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The propylene-based polymer can have a triad tacticity of three propylene units, as measured by 13C NMR of 75% or greater, 80% or greater, 82% or greater, 85% or greater, or 90% or greater. Preferred ranges include from about 50 to about 99%, more preferably from about 60 to about 99%, more preferably from about 75 to about 99% and more preferably from about 80 to about 99%; and in other embodiments from about 60 to about 97%. Triad tacticity is determined by the methods described in US 2004/0236042.

The propylene-based polymer can be a blend of discrete random propylene-based polymers. Such blends can include ethylene-based polymers and propylene-based polymers, or at least one of each such ethylene-based polymers and propylene-based polymers. The number of propylene-based polymers can be three or less, more preferably two or less.

The propylene-based polymer can include a blend of two propylene-based polymers differing in the olefin content, the diene content, or both.

The propylene-based polymer can include a propylene based elastomeric polymer produced by random polymerization processes leading to polymers having randomly distributed irregularities in stereoregular propylene propagation. This is in contrast to block copolymers in which constituent parts of the same polymer chains are separately and sequentially polymerized.

The propylene-based polymers can include copolymers prepared according the procedures in WO 02/36651. Likewise, the propylene-based polymer can include polymers consistent with those described in WO 03/040201; WO 03/040202; WO 03/040095; WO 03/040201; WO 03/040233; and/or WO 03/040442. Additionally, the propylene-based polymer can include polymers consistent with those described in EP 1 233 191, and U.S. Pat. No. 6,525,157, along with suitable propylene homo- and copolymers described in U.S. Pat. No. 6,770,713 and US 2005/215964, all of which are incorporated by reference. The propylene-based polymer can also include one or more polymers consistent with those described in EP 1 614 699 or EP 1 017 729.

Grafted (Functionalized) Backbone

The resulting polymer can be grafted (i.e., "functionalized") using one or more grafting monomers. As used herein, the term "grafting" denotes covalent bonding of the grafting monomer to a polymer chain of the propylene-based polymer.

Preferably, the grafting monomer is at least one ethylenically unsaturated carboxylic acid or acid derivative, such as an acid anhydride, ester, salt, amide, imide, acrylates or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo (2.2.1)heptene-2,3-dicarboxylic acid anhydride, maleopimaric acid, tetrahydrophtalic anhydride, norbornene-2,3-dicarboxylic acid anhydride, nadic anhydride, methyl nadic anhydride, himic anhydride, methyl himic anhydride, and x-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer.

The grafted polymer comprises from about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment wherein the graft monomer is maleic anhydride, the maleic anhydride concentration in the grafted polymer is preferably in the range of about 1 to about 6 wt %, preferably at least about 0.5 wt % and highly preferably about 1.5 wt %.

Styrene and derivatives thereof such as paramethyl styrene, or other higher alkyl substituted styrenes such as t-butyl styrene can be used as a charge transfer agent in presence of the grafting monomer to inhibit chain scissioning. This allows further minimization of the beta scission reaction and the production of a higher molecular weight grafted polymer (MFR=1.5).

Adding Quenching Agent to Polymerization Effluent

A quenching agent can be added to the polymer effluent stream prior to or downstream of the spuiral heat exchanger(s) to prevent further polymerization, i.e., quench the polymerization reaction. Any suitable quenching agents known in the art can be used, e.g., small, polar, protic molecules, such as water and methanol. Additionally or alternatively, polyhydric quenching agents with high molecular weights, such as those described in U.S. Application Ser. No. 62/368,477, filed on Jul. 29, 2016, can be used.

Products and Articles Made from the Polymer

The resulting polymers can be used to make various finished goods. The manufacturers of finished goods may utilize the polymers as single components or blend them with other components that impart specific properties, such as tensile strength, impact strength, temperature resistance, etc. Typical finished goods include hygiene products, such as diapers and female hygiene products.

The resulting polymers also can be used to make adhesives, wires, wiring and cable insulation materials. The resulting polymers also can be used to make automotive parts, such as belts, hoses, window seals, wiper blades, door panels, dashboards, bumper elements, fasteners, etc. The resulting polymers also can be used to make containers for medicines and garments used by medical professionals and patients.

While the foregoing has been disclosed and described in preferred forms with a certain degree of particularity, it is understood that the present disclosure of the preferred to forms is only by way of example and that numerous changes in the details of operation and in the combination and arrangement of parts can be resorted to without departing from the spirit and scope of the invention, which is defined by the claims that follow.

What is claimed is:

1. A method for solution polymerization, comprising:
   forming a first mixture stream consisting essentially of at least one catalyst and a process solvent;
   forming a second mixture stream consisting essentially of at least one activator and the process solvent;
   feeding the first mixture stream and the second mixture stream separately to at least one reaction zone of a first loop reactor comprising one or more monomers dissolved in the process solvent;
   polymerizing the at least one monomers within the at least one reaction zone in the presence of the catalyst, activator and process solvent; and
   recovering a polymer.

2. The method of claim 1, wherein the first mixture stream consists essentially of the at least one catalyst, the process solvent, and one or more olefins.

3. The method of claim 1, wherein the second mixture stream consists essentially of the at least one activator, the process solvent, and one or more olefins.

4. The method of claim 1, wherein only one of the first mixture stream and the second mixture stream, but not both streams, further comprises one or more olefins.

5. The method of claim 1, wherein the reaction zone comprises at least one spiral heat exchanger disposed therein.

6. The method of claim 1, wherein the polymerizing comprises obtaining an effluent stream, and wherein recovering the polymer comprises separating the effluent stream into a product stream comprising the polymer that is substantially free of the solvent and a recycle stream comprising the process solvent and unreacted monomer.

7. The method of claim 1, wherein the monomer comprises one or more C2 to C40 olefins.

8. The method of claim 7, wherein the one or more C2 to C40 olefins are selected from the group consisting of ethylene, propylene, butene, pentene, hexene, heptene, octene, nonene, decene, undecene, and dodecene.

9. The method of claim 1, wherein the polymer comprises polyethylene, polypropylene, or a copolymer thereof.

10. The method of claim 1, wherein the polymer is an ethylene polymer or a propylene polymer, or a copolymer thereof.

11. The method of claim 1, wherein the polymer comprises one or more C2 to C20 comonomers.

12. The method of claim 11, wherein the one or more C2 to C20 comonomers are selected from the group consisting of ethylene, propylene, butene, pentene, hexene, heptene, octene, nonene, decene, undecene, and dodecene.

13. A method for solution polymerization, comprising:
    forming a first mixture stream consisting essentially of at least one catalyst and a process solvent;

forming a second mixture stream consisting essentially of at least one activator and the process solvent;

feeding the first mixture stream and the second mixture stream separately to at least one reaction zone comprising one or more monomers dissolved in the process solvent;

polymerizing the at least one monomers within the at least one reaction zone in the presence of the catalyst, activator and process solvent to obtain a first effluent stream comprising a solution of polymer dissolved in the process solvent;

cooling the first effluent stream in at least one spiral heat exchanger to produce a second effluent stream, wherein the first effluent stream flows through the at least one spiral heat exchanger in a cross-flow direction relative to spirals of the at least one spiral heat exchanger; and recovering the polymer.

14. The method of claim 13, wherein recovering the polymer comprises separating the second effluent stream into a product stream comprising the polymer that is substantially free of the solvent and a recycle stream comprising the process solvent and unreacted monomer.

15. The method of claim 13, wherein the first mixture stream consists essentially of the at least one catalyst, the process solvent, and one or more olefins, and wherein the second mixture stream consists essentially of the at least one activator, the process solvent, and one or more olefins.

16. The method of claim 13, wherein only one of the first mixture stream and the second mixture stream, but not both streams, further comprises one or more olefins.

17. The method of claim 13, wherein the polymer is an ethylene polymer or a propylene polymer, or a blend thereof, and the polymer comprises one or more C2 to C20 selected from the group consisting of ethylene, propylene, butene, pentene, hexene, heptene, octene, nonene, decene, undecene, and dodecene.

18. A method for solution polymerization, comprising:

apportioning a reactant feed comprising one or more monomers, process solvent, and optionally one or more comonomers into a first substream, a second substream, a first slip stream and a second slip stream;

forming a first mixture stream consisting essentially of at least one catalyst and the first substream;

forming a second mixture stream consisting essentially of at least one activator and the second substream;

mixing the first mixture stream with the first slip stream;

mixing the second mixture stream with the second slip stream;

feeding the resulting first mixture stream and the resulting second mixture stream separately to at least one reaction zone;

polymerizing the at least one monomers and optional one or more comonomers within the at least one reaction zone in the presence of the catalyst, activator and process solvent; and recovering the polymer.

19. The method of claim 18, wherein the first slip stream is less than 10 wt % of the first substream and the second slip stream is less than 10 wt % of the second substream.

\* \* \* \* \*